United States Patent [19]
Panzeri

[11] Patent Number: 4,764,658
[45] Date of Patent: Aug. 16, 1988

[54] PROCESS AND APPARATUS FOR WELDING STEAM TURBINE DIAPHRAGMS

[75] Inventor: Cesare Panzeri, Macherio, Italy

[73] Assignee: Ansaldo Componenti S.p.A., Genoa, Italy

[21] Appl. No.: 891,325

[22] Filed: Jul. 31, 1986

[30] Foreign Application Priority Data

Sep. 20, 1985 [IT] Italy .................. 22225 A/85

[51] Int. Cl.⁴ .................................. B23K 9/225
[52] U.S. Cl. .................. 219/137 R; 219/125.11; 29/156.8 R
[58] Field of Search .......... 29/156.4 R, 156.8 R, 29/156.8 CF, 401.02, 23.5; 228/181–184; 219/137 R, 125.1, 125.11, 72, 136

[56] References Cited

U.S. PATENT DOCUMENTS

| | | | |
|---|---|---|---|
| 2,454,580 | 11/1948 | Thielemann | 228/182 X |
| 3,230,616 | 1/1966 | Janssen | 219/137 R X |
| 4,086,690 | 5/1978 | Bernasconi | 219/72 X |
| 4,288,677 | 9/1981 | Sakata et al. | 219/121 ED |
| 4,577,089 | 3/1986 | Olson et al. | 219/136 X |

FOREIGN PATENT DOCUMENTS

| | | | |
|---|---|---|---|
| 0049899 | 4/1982 | European Pat. Off. | 219/76.12 |
| 1440507 | 11/1968 | Fed. Rep. of Germany | 219/125.11 |
| 964592 | 7/1964 | United Kingdom | 29/156.8 CF |

OTHER PUBLICATIONS

*Metals Handbooks,* 8th Ed., vol. 6, Metals Park, Ohio: American Society for Metals, 1971, pp. 272, 222-223.

*Primary Examiner*—H. Broome
*Assistant Examiner*—C. M. Sigda
*Attorney, Agent, or Firm*—Young & Thompson

[57] ABSTRACT

The welding of the body and of the ring with the distributor of a steam turbine diaphragm is carried out in four different areas holding an assembly, formed by two semi-diaphragms, in a substantially vertical position, at most tilted a few degrees off vertical, while four welding units operate simultaneously, two for each face of the assembly, providing for each assembly face to be suitably heated. Two supports are provided, one movable in respect to the other for positioning and handling of the assembly to be treated. Provision is made for vertically adjusting the assembly position with respect to a referring surface, so that the area on which each welding unit works is always on the same level, whatever the dimensions of the assembly to be welded. Provision is also made for heating and insulating both the assembly faces.

4 Claims, 4 Drawing Sheets

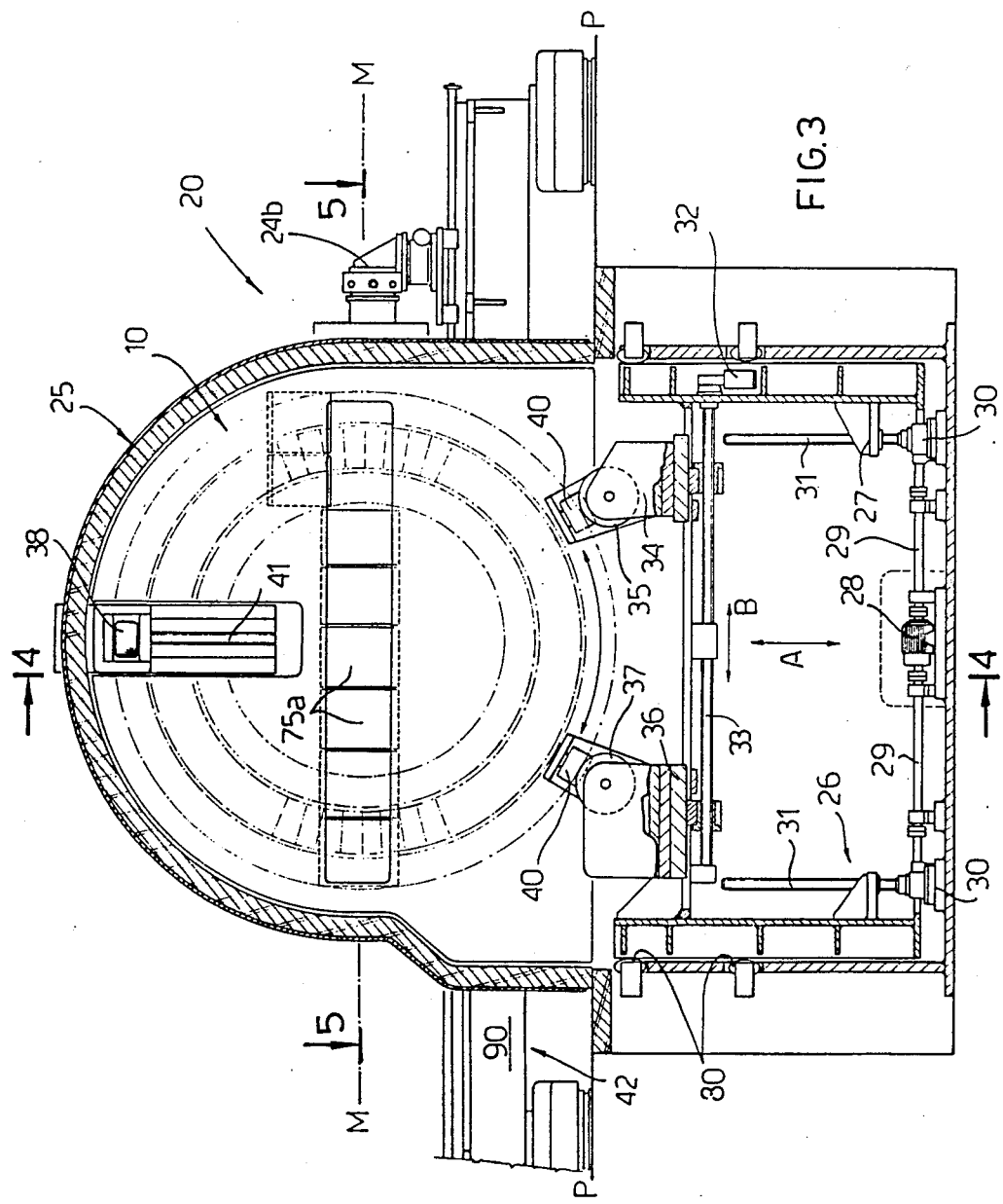

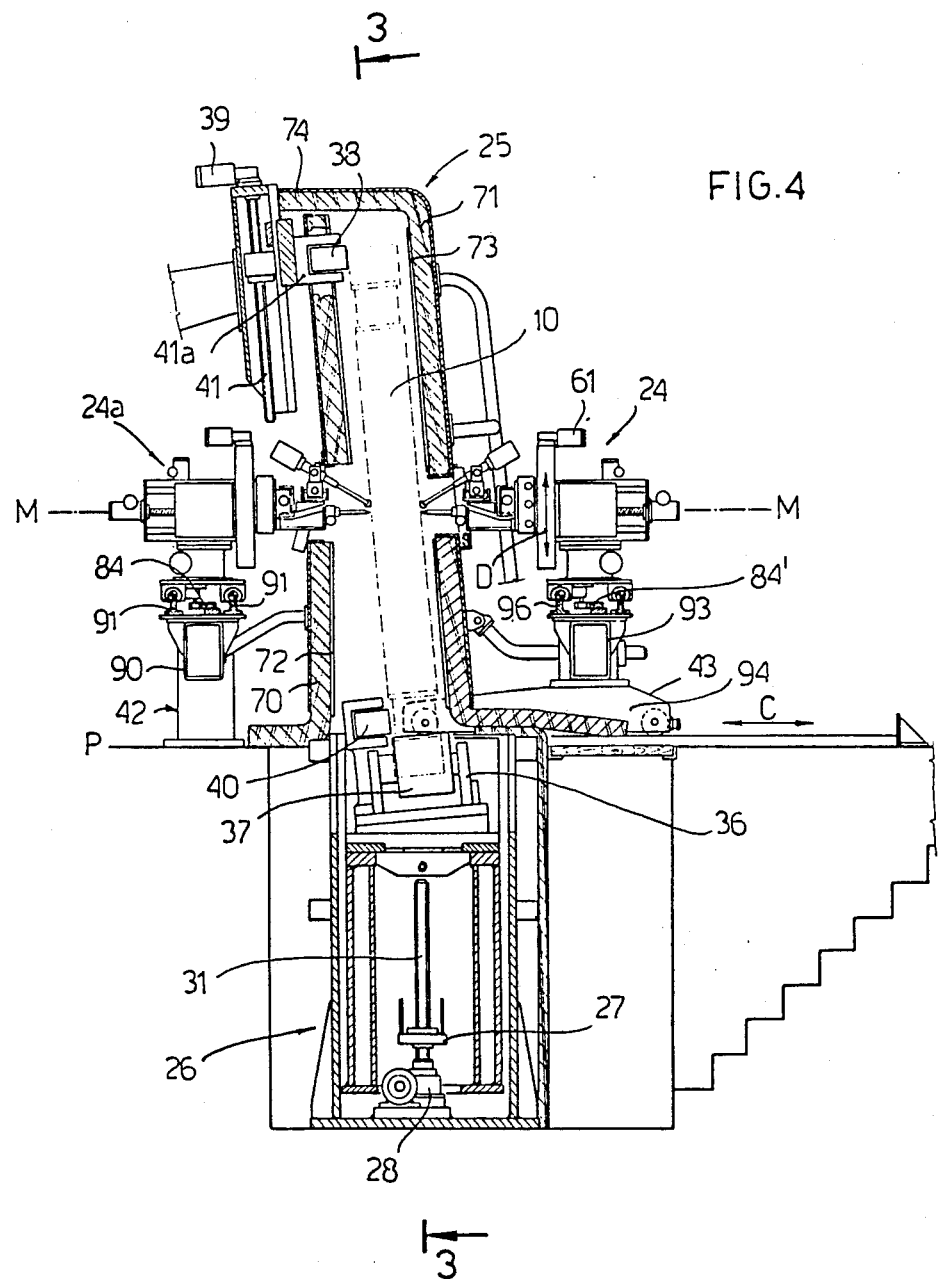

PROCESS AND APPARATUS FOR WELDING STEAM TURBINE DIAPHRAGMS

The subject of this invention is a process and apparatus for welding, generally arc welding, steam turbine diaphragms.

The making of steam turbine diaphragms by suitably joining two semi-diaphragm elements is already known.

According to the known technique, a semi-diaphragm is made up of a semi-distributor, comprising blades welded to an internal and to an external strap; the semi-distributor is welded on one side to a body and on the other to a ring. The welding of the semi-distributor to said body and ring is carried out in four different areas, each extending along an arc of a nearly semicircular shape. According to one method of the known technique, the semi-distributor, suitable ground, is clamped to the body and to the ring; the semi-diaphragm thus obtained is tacked and braced using U-bolts. Then two tacked and braced semi-diaphragms are brought together and joined by welding. A unit or assembly is thus obtained composed of two tacked and braced semi-diaphragms ready for welding at four annular areas; two areas between body and semi-distributor, one on each face, two areas between semi-distributor and ring, one on each face. It should be noted that the assembly obtained in this way is not perfectly circular due to the inaccurate matching of the ends of the two semi-diaphragms. Therefore, the resulting unit is slightly ovalized. In the subsequent welding it must be possible to detect and to make allowance for the welding profile.

The welding, according to the known technique, is carried out horizontally on a rotating bench with pairs of welding units working on a single face. The known welding station comprises a preheating system, for example electric or at infrared rays. In order to carry out welding on the opposite side, the assembly comprising the two semi-diaphragms is translated on a tip-over device, the U-bolts are removed and the assembly is returned to the welding station to work on the other side.

The next stage is to separate the two semi-diaphragms making up the assembly: they are treated so as to be perfectly semi-circular and conveyed to where the diaphragm is to be fitted to the turbine, then two perfectly semi-circular semi-diaphragms are welded together so as to form a perfectly circular diaphragm.

Still following the known technique, welding is carried out on each face separately during the stage of welding together the ring, the semi-distributor and the body. As the surfaces whereon the welding is being carried out are, not perfectly perpendicular, the rotating bench must be tilted. It is also necessary to suitably intervene on the preheating device and working of the welding torches, so that deformations due to uneven preheating and subsequent post-welding shrinkage are reduced as much as possible.

However, given that the other face is never treated at the same time, there is a difference in temperature which greatly affects the symmetry of the welding self-stresses.

An object of this invention is therefore to realize a process and related apparatus which allows to carry out a welded assembly, even if slightly ovalized (being formed by two semi-diaphragms not perfectly semi-circular), which is of a better quality due to reduce deformations resulting from welding self-stresses, to reduced temperature gradients inside the piece under treatment, to better protection of the welding bath.

Another aim is the reduction of the preheating time.

A further object is to realize an apparatus which increases productivity through a drastic reduction of idle time.

A further aim is to realize a unit which can be robotized.

The aims are obtained by foreseeing a process wherein the assembly to be treated is arranged in a basically vertical position which is adjusted so that at least one of its main axes is placed at a constant prefixed height from the supporting surface of the welding units. Then the assembly is made to rotate at a constant speed, while the welding is carried out simultaneously at four different areas along curved arcs, two on each face, on both faces; each face being heated continuously.

It is also an object of this invention an apparatus comprising means to support basically vertically a two semi-diaphragms assembly, the elements of which must be welded together. The apparatus also comprises heating and insulating means and means to rotate the unit.

The realization of a qualitatively better unit is achieved through reduction of deformations deriving from welding self-stresses, which is obtained by positioning the welding torches symmetrically in respect to the diaphragm section; the reduction of the temperature gradients inside the processed diaphragm obtained by an even and symmetrical distribution of the radiant heat sources (preheating panels) as regards to the diaphragm; a better protection of the welding bath due to the termodynamical effect of the radiant sources which facilitate the flow of the shielding gas.

The reduction in preheating time is obtained by an increase of the radiant surfaces, specific power being equal.

The new process and apparatus allows for reduced deformations of the assembly; a constant temperature along the width of the piece and a symmetry of the welding self-stresses are obtained as a result of an even distribution of the temperature sources; a better gas shielding at the welding points is obtained. Greater efficiency is also achieved as four welding units are used at the same time and finally there is a drastic reduction in idle time due to the elimination of the tipping over of the piece and the positioning of the welding units.

The apparatus can also be easily robotized.

Further advantages and characteristics of the invention will be evident from the description and accompanying drawings, related to a non-restrictive exemplary embodiment of the invention, wherein:

FIG. 3 shows a sectional view, along 3—3 FIG. 4, of the apparatus according to the invention;

FIG. 4 is a sectional view along 4—4 in FIG. 3;

Figure 1:
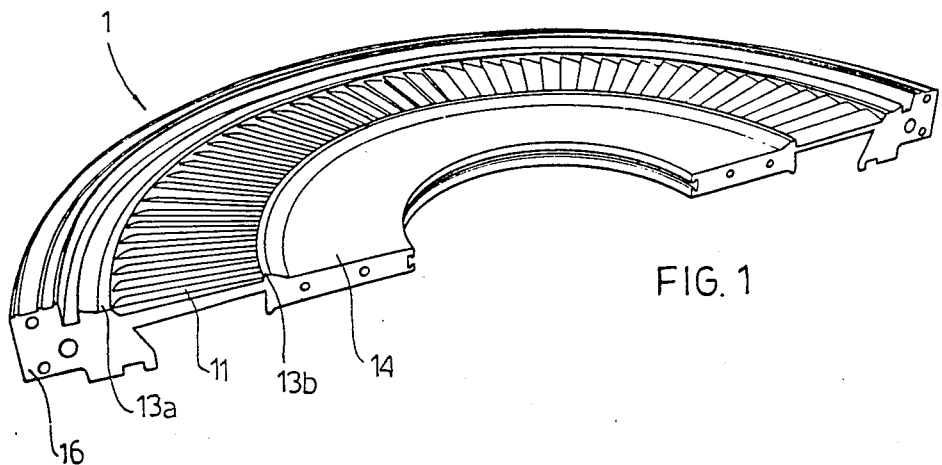
FIG. 1 is a perspective view of a semi-diaphragm for a steam turbine.
Figure 2:
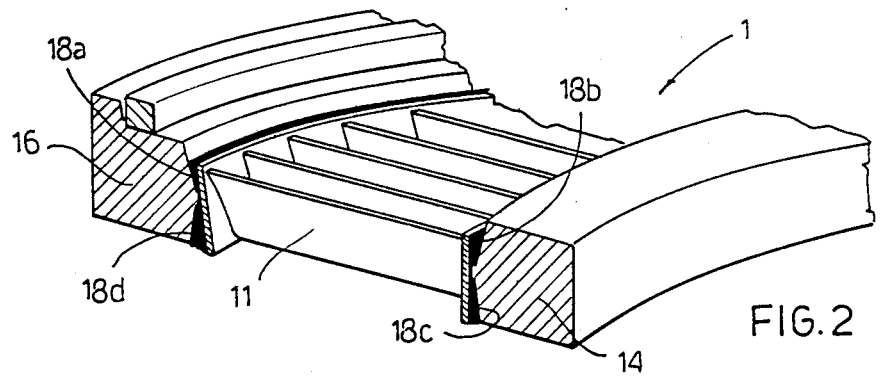
FIG. 2 shows in broken-away perspective view, in an enlarged scale with respect to FIG. 1, a semi-diaphragm and in particular the areas where the welding is to be carried out.
Figure 6:
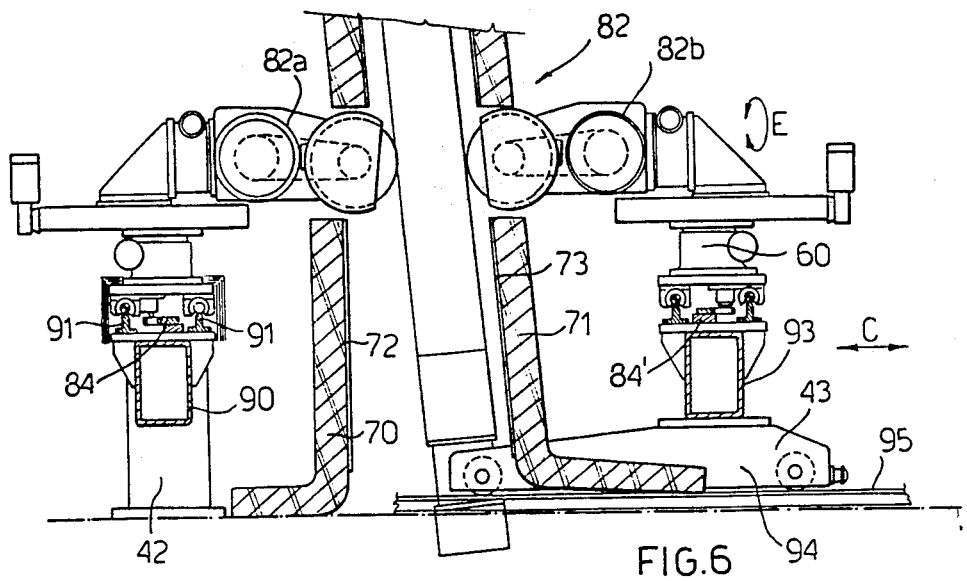
FIG. 6 is a sectional view along 6—6 in FIG. 5, showing in particular the grinding units applied to the assembly according to the invention, in an enlarged scale with respect to FIGS. 4 and 5.

Referring to FIGS. 1 and 2, a semi-diaphragm 1 for a steam turbine is shown. Said semi-diaphragm 1 is made up of a semi-distributor 11 comprising an external strap 13a and an internal strap 13b to which the blades are welded. The semi-distributor is fixed to a body 14 and a ring 16. There are four areas where the welding is to be carried out, as can be seen in FIG. 2, namely: 18a and 18d between semi-distributor and ring; 18b and 18c between semi-distributor and body.

The four weldings are carried out on an assembly 10 made up of two semi-diaphragms which are brought together and propped, following a known technique. Each semi-diaphragm has its distributor, body and ring tacked together. The resulting assembly is generally ovalized.

Figure 5:
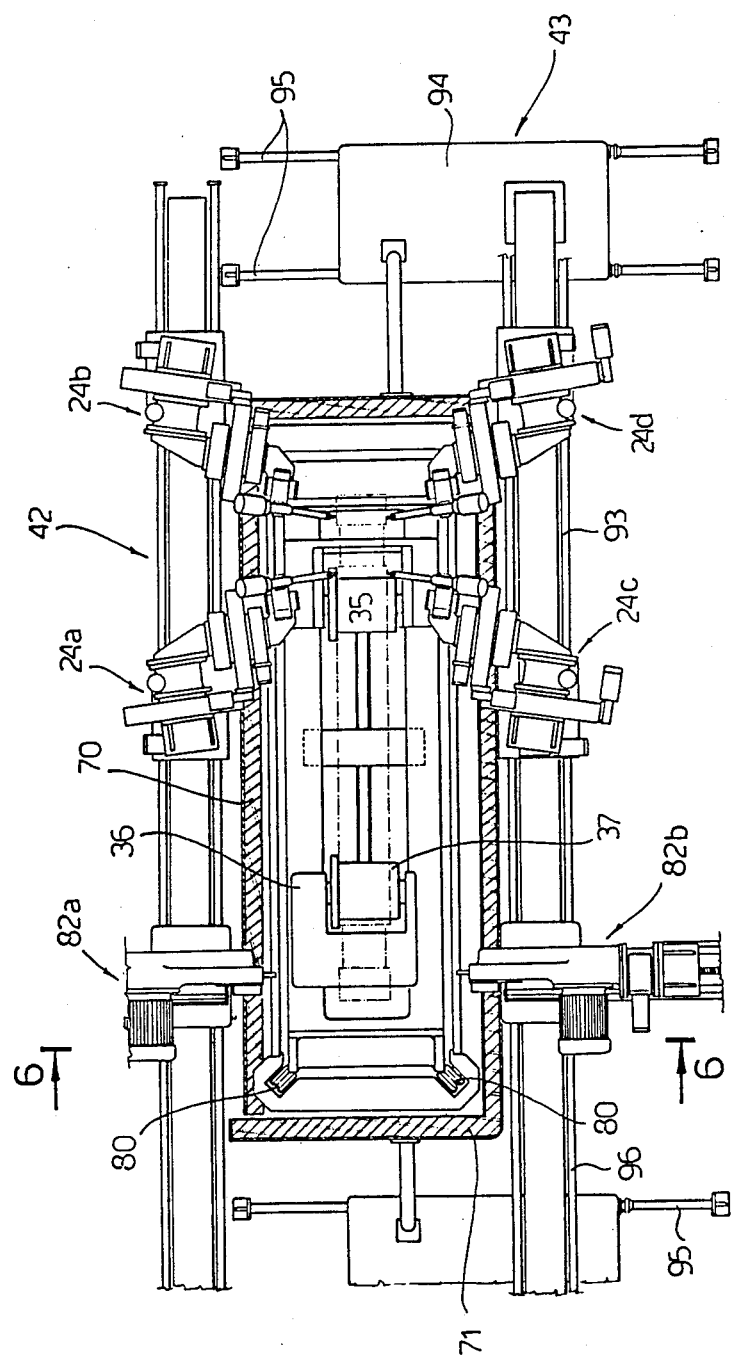
FIG. 5 is a sectional view along 5—5 of FIG. 3.

A welding apparatus 20, according to the invention, is shown in FIGS. 3, 4 and 5. Said apparatus 20 basically comprises a supporting and handling mechanism 26 for the assembly 10 to be welded, a welding group 24 and a heating and insulating group 25.

Referring now to FIG. 3, a handling unit or structure 26 for diaphragm 10, which comprises a mechanism for handling in the direction of arrow A (height regulation), is shown in detail. Said mechanism consists of a motor 28 which, through transmissions 29 and reduction gears 30, operates two jacks 31 causing the movement of the movable part 27 of the mechanism regulating the height. The movable part is guided in its movement by guide rollers 80 (FIG. 5). Supports 34 and 36 for holding the assembly 10 to be welded are fixed onto this part 27. The distance between supports 34 and 36 can, in turn, be adjusted, i.e. they can be moved in the direction of arrow B by means of a motor 32 which moves a left and right screw 33. Support 34 carries an idle roller 35, support 36 carries a motorized roller 37, both rollers having a basically horizontal axis.

The above-described handling unit 26 allows an assembly subjected to welding, made up of two semi-diaphragms of any size, to be moved in a vertical direction. In fact the two rollers 35 and 37 can be moved closer together or farther apart as required, whereas the entire assembly can be displaced in respect to surface P—P (for instance the floor level), so that the line M—M of the diaphragm, corresponding to one of the main axes thereof, is always on the same level, which is the working level of the welding group 24 (as it will be explained later). The assembly 10 of the two semi-diaphragms is also held on a face by lower idle support rollers 40, and by an upper idle support roller 38. Clearly the placing of the support rollers can be different from the one shown in the drawings.

FIG. 4 shows again in detail the supporting and handling structure 26 for the diaphragms assembly. Therein can be seen the side supporting rollers 38 and 40 for the assembly, which are placed with a substantially vertical axis, at most tilted at an angle between 5° and 7° with respect to a vertical axis. The upper support unit comprising the supporting roller 38 can be adjusted relative to the median area M—M where the welding is carried out. This adjustment is done by means of a motor 39 with reduction gear which causes the support 41a of the roller 38 to move along a rod 41. The apparatus comprises also a fixed structure and a movable one, on which the welding group and the heating and insulating group are assembled. In a foreseen variation, both structure could be movable.

The fixed structure is indicated by 42 and, in the shown example, comprises a horizontal crosspiece 90, fitted for example with rails 91 and with a rack 84. Two welding units 24a of the welding group move along the rails, each engaging track 84 with a relative pinion. The fixed structure carries as well a fixed part of the heating and insulation group 25, comprising an insulating panel 70, to which a heating group 72 is attached at its fixed part. The movable structure is globally indicated by 43 and comprises a crosspiece 93 assembled on trolleys 94 movable along guides 95 in the direction of arrow C. The crosspiece 93, similarly to 90, has rails 96 and a track 84'; two welding units 24c, d, move along the rails, each engaging the track 84' with a relative pinion. The movable structure has as well an insulating wall or panel 71 with a heating element 73 attached to it. The movable part of the heating-insulating group 25 has a cap insulating portion 74 which extends at the top to prevent heat escaping during the welding stage. The heating group is provided with heating plates placed adjacent to one another.

Units per se known can be used as welding units 24a, b, c, d with possibilities of movement along three directions (two horizontal and one vertical, by means of slide 61, arrow D) and with tilting possibility, so that each torch can be positioned in the most convenient way with regards to the channel provided in the diaphragm to receive the welding material.

A feeler pin controlling the welding torches according to the piece ovalization can be provided. The torch can have a memorizing device to record the previous run (self-instructing torch), in particular apparatuses for automatic welding of joints, according to Italian patent application No. 31246 A/78, filed Dec. 22, 1978 and published June 22, 1980, can be used.

The welding units operate in line with the surface M—M. Suitable hatches 75a are provided in the heating and insulating group 25 for this purpose and they can be moved as required so as to leave an opening for each welding unit to intervene on the desired area (see FIG. 3), according to the dimensions of the diaphragm.

According to one process and apparatus preferred embodiment, grinding can be carried out after welding. Two grinding units, forming a grinding group 82, are respectively indicated by 82a and 82b and respectively pre-arranged on the fixed structure 42 and the movable structure 43. They slide parallel to the diaphragm faces, along the rails, respectively 91 and 96, and the tracks, respectively 84 and 84', by means of a pinion device similar to the one of the welding units. The grinding units can be fitted with 3-axis handling units and a tilting unit (arrow E) similarly to the welding units.

The process is herewith described.

Once the assembly 10 made up of the two semi-diaphragms has been obtained, the movable part 43 is displaced in the direction indicated by arrow C in FIG. 4 and said assembly 10 is introduced from above positioning it in such a way that it is held by rollers 35, 37 and 40, 38. Assembly 10 is arranged basically in a vertical position, at most tilted a few degrees off vertical. The handling mechanism 26 is then actuated so as to bring one of the main axes of said assembly in line with M—M. The distance between the supports 34 and 36 is set according to the dimensions of the workpiece. At least one of the hatches 75a is partly opened so that the four welding units 24 can be positioned in line with the areas 18a, 18b, 18c and 18d. The motor-driven roller 37 is actuated so as to rotate the assembly at a constant speed, matching that of the seam welding operation. The welding units are set in operation and welding proceeds at all four areas simultaneously. Welding may be more or less automated according to the type of torch used. If the areas to be welding by two adjacent torches are very close together, the motorized slide 61 can be actuated so that said torches operate on surfaces which are vertically offset. Lastly, grinding is carried out using the grinding units 82.

It is clearly evident that the present apparatus provides better quality welding due to: (a) reduced deformations because of the symmetry of the welding self-stresses; (b) the constant temperature along the width of the surface, a result of even distribution of the temperature sources; (c) better gas shielding at the weld point from the thermodynamic effect of the temperature souces.

What I claim is:

1. A process for welding steam turbine diaphragms, comprising temporarily assembling two semi-diaphragms into an assembly to be welded, holding the assembly in a substantially vertical position with one of the main axes of one of said semi-diaphragms at a predetermined height, rotating said assembly at a constant speed while simultaneously carrying out welding on both opposite faces of said assembly, heating each said face continuously so as to cause substantially even heating on both said assembly faces in the areas to be welded, carrying out said welding by means of self-instructing welding torches simultaneously on two different diameters for each said face, one of said diameters being disposed between a body and a semi-distributor of the turbine diaphragm to be welded, and the other diameter being disposed between said semi-distributor and a ring of the steam turbine diaphragm to be welded.

2. Welding apparatus to weld together a body and a semi-distributor and a ring in each of two steam turbine semi-diaphragms assembled so as to form an assembly, said apparatus comprising a support and handling unit for said assembly, a heating and insulating group for each of two opposite faces of said assembly, a welding group comprising on each said assembly face at least one self-instructing torch positioned for welding between the body and the distributor and at least one self-instructing torch positioned for welding between said distributor and said ring, the torches on opposite faces of said assembly being opposed to each other.

3. Apparatus as claimed in claim 2, in which said support and handling unit comprises two workpiece supports mounted for movement toward and away from each other, one of said workpiece supports having a roller and power means to rotate the roller so as to rotate said assembly.

4. Welding apparatus to weld together a body and a semi-distributor and a ring in each of two steam turbine semi-diaphragms assembled so as to form an assembly, said apparatus comprising an assembly support and handling unit, a heating and insulating group for each of two opposite faces of said assembly, a welding group, at least one movable support structure for the welding and heating and insulating groups, said movable support structure having an insulation means of said insulating group, said insulation means comprising a substantially vertical wall and a cap portion arranged at the top of the wall.

* * * * *